United States Patent
Bueermann

(10) Patent No.: US 6,729,953 B2
(45) Date of Patent: May 4, 2004

(54) DISTRIBUTION DEVICE FOR A STRAW CHOPPER

(75) Inventor: Martin Bueermann, Hornbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/358,442

(22) Filed: Feb. 4, 2003

(65) Prior Publication Data

US 2003/0162576 A1 Aug. 28, 2003

(30) Foreign Application Priority Data

Feb. 22, 2002 (DE) .......................... 102 07 479

(51) Int. Cl.⁷ ................................ A01F 12/40
(52) U.S. Cl. ...................... 460/112; 460/901
(58) Field of Search .................. 460/112, 901, 460/111, 44, 63, 66, 71, 78; 241/243

(56) References Cited

U.S. PATENT DOCUMENTS

| | | | |
|---|---|---|---|
| 4,921,469 A | 5/1990 | Scharf | 460/10 |
| 5,569,081 A | 10/1996 | Baumgarten et al. | 460/112 |
| 6,331,142 B1 * | 12/2001 | Bischoff | 460/112 |

FOREIGN PATENT DOCUMENTS

| | | |
|---|---|---|
| DE | 80 14 119 | 9/1980 |
| DE | 197 05 843 A1 | 8/1998 |
| EP | 0 537 621 A2 | 4/1993 |
| EP | 1 151 652 A1 | 11/2001 |
| WO | 03/005803 A1 | 1/2003 |

* cited by examiner

*Primary Examiner*—Árpád Fábián Kovács

(57) ABSTRACT

A distribution device for straw chopper comprising a guide arrangement, a motor for the positioning the guide arrangement and a control arrangement for controlling the motor. At least one position input device is coupled to the control arrangement. The control arrangement can be operated selectively in a first operating mode and a second operating mode. The first operating mode is activated by the actuation of the position input device for a time interval less than a predetermined threshold value, and the second operating mode is activated by the actuation of the position input device for a time interval greater than the predetermined threshold value. In the first operating mode the guide arrangement is brought into a predetermined position and in the second operating mode the guide arrangement is moved as long as the position input device is actuated.

15 Claims, 4 Drawing Sheets

DISTRIBUTION DEVICE FOR A STRAW CHOPPER

FIELD OF THE INVENTION

The invention is directed to a distribution device for a straw chopper, having a guide arrangement, a motor for positioning the guide arrangement and a control arrangement that is connected with the motor as well as at least one manually operated position input device for inputting the desired position of the guide arrangement.

BACKGROUND OF THE INVENTION

It is desirable for straw choppers attached to combines to distribute the chopped remains of the crop across the width of the cutter head at the rear of the combine. The ejection of the chopped crop into the remaining stand of the crop that has not yet been harvested should be avoided. Particularly in operation with a cross wind the operator is required with each change in the direction of operation that produces a change in the direction of the flow of the wind on the combine, to reposition the guide vanes of the straw chopper with a manual input in an input device. The input device brings about a motorized repositioning of the guide vanes. In known input devices a button must be pressed for such a time until the guide vane reaches the desired position. Since a visual check must be performed simultaneously to determine whether the target position has been reached, the repositioning process is relatively time consuming and distracts the operator from his primary activity, the steering and operation of the combine. As a result the continuing repositioning of the guide vanes is omitted and the operator positions the guide vanes for a relatively narrow distribution, in which no chopped crop is thrown into the remaining upright stand of the crop. This results in the chopped crop not being ejected over the entire width of the cutter head. This is a disadvantageous in no tillage operations.

Distribution devices have also been proposed that use sensors to detect the inclination of the ground and/or the wind direction or the wind speed and its strength or the direction of flight of the ejected chopped crop and automatically reposition the guide vanes. It has also been proposed that the position of the standing stand of the crop relative to the combine be detected by manual input or a video camera, and to reposition the guide vanes as a function of the position detected. However, costly sensors would be required.

EP 1 151 652 A describes a harvesting machine with an ejection elbow that can be rotated about the vertical axis for the transfer of the chopped crop to the loading chamber of an accompanying vehicle. Information about the immediate position of the ejection elbow is stored in memory. After actuating a corresponding key, the ejection elbow is rotated into the mirror image position relative to the longitudinal axis of the harvesting machine in order to be able to position the accompanying vehicle at the same position of the harvesting machine after turning at the edge of the field.

In combines of the model series CTS of the applicant a drive control lever equipped with various keys is applied. Some of the keys are used to recall previously programmed height and forward/rearward positions of the reel. If a key is pressed only briefly, the values stored in memory are recalled. If it is pressed for a longer period of time, information about the position of the reel at that time, which can be recalled later, is stored in memory.

SUMMARY OF THE INVENTION

It is an object of the present invention to provide a low cost but operator friendly arrangement for repositioning the guide elements.

The control arrangement of the present invention can be operated in a first or a second operating mode that can be selected. The first operating mode is selected by actuating the position input device for only a relatively short time interval, that is, for a time interval that is less than a predetermined threshold value. In the first operating mode the control arrangement instructs the motor to bring the guide arrangement into a predetermined position. The second operating mode is selected by actuation of the same position input device, for a longer period of time that lies above the threshold value. In the second operating mode the control arrangement instructs the motor to move the guide arrangement for such a period of time as long as the position input device is actuated.

In this way the operator can recall a predetermined position of the guide arrangement by an actuation of the same position input device on the one hand (by a brief actuation) and on the other hand (by a longer actuation) can pivot the guide arrangement for such a time until it has reached a desired position. Therefore for two different functions only a single position input device is required, which reduces the number of parts and the space needed for these parts.

Although it would be conceivable that only one position input device be provided with which the guide arrangement can be repositioned in one direction of rotation through 360° or with which a direction is associated which can be recalled by a switch or the like, as a rule at least two position input devices are provided each of which is associated with different, opposing repositioning arrangements of the guide arrangement.

In the first operating mode the motor brings the guide arrangement into a predetermined position. This position may be a position that corresponds to a position information that has been stored in memory. The operator can then recall the desired position by selecting the first operating mode. In case that several position input devices are available several positions can be recalled. In many cases, for example, after a change in the direction of a swath, it is, nevertheless, useful to bring the guide arrangement into a position that is symmetrical to the previous position of the guide arrangement relative to the longitudinal center plane of the harvesting machine. If the guide vanes of the guide arrangement are pivoted initially, for example, by 20° to the left relative to the longitudinal axis, in order to avoid harvested crop remains reaching the stand of the crop located on the right side of the harvesting machine, the guide arrangement is pivoted through 40° to the right after the turn at the end of the field by activating the first operating mode, so that it is located 20° to the right relative to the longitudinal center plane, since then the stand of the crop lies on the left side of the harvesting machine. The last value entered could also be operated upon that lies beyond the longitudinal axis, so that unsymmetrical positions can also be operated upon. The latter may also be useful, for example, in the case of side wind, since in the first direction of operation the guide arrangement needs to be repositioned less (or more) than in the other direction of operation.

In order to be able to bring the guide arrangement into a position symmetrical to the previous position, that is a mirror image position about the longitudinal center plane, an obvious solution is to store information about the position of the guide arrangement at that time in memory after the end of the second mode of operation or before any initiation of the first mode of operation. Then the control arrangement brings the guide arrangement into the mirror image position or the position last operated in on the other side corresponding to the information stored in memory.

The predetermined threshold value for the first time interval at the end of which the control arrangement goes over into the second operating mode is preferably variable. It can be provided as input, for example, over a keyboard in an on-board computer of the harvesting machine.

In case an operator wants to further reposition the guide arrangement by a smaller amount or a larger amount, after he has moved it in the second operating mode, it would be of little help if the guide arrangement had been brought into the predetermined position in the first operating mode on the basis of a further actuation of the position input device. Therefore in a preferred embodiment the control arrangement transfers into a third operating mode after it has left the second operating mode, that is, when the position input device is no longer actuated. Then in the third operating mode actuation of the position input device immediately recalls the second operating mode—this circumvents the first operating mode which in this case would lead to an undesirable repositioning of the guide arrangement—in which the guide arrangement is moved for such a time interval as long as the position input device is actuated. The third operating mode is active for a predetermined (second) time interval whose length is preferably variable, in particular by means of a keyboard. In case two position input devices are available, that are associated with opposite repositioning directions of the guide arrangement, after the conclusion of the second operating mode, the third operating mode is appropriately activated in each case for both position input devices, so that then a fine adjustment of the guide arrangement can be performed by actuation of the two position input devices in both directions.

The invention can be applied to combines in which the guide arrangement is located downstream of a straw chopper. It can also be applied to forage harvesters whose guide arrangement is a discharge elbow arranged downstream of a chopper drum.

The guide arrangement may be guide vanes known in themselves, that are arranged downstream of a straw chopper and are attached to a straw distributor hood. On the other hand the guide arrangement may also be a duct that is arranged downstream of a blower. The duct may also be arranged downstream of a chopper, for example, a web disk wheel chopper. Such a duct may be pivoted continuously back and forth about an approximately vertical axis, in order to cover a sufficient width that preferably corresponds approximately to the width of the cutter head. The invention makes it possible to adjust the region of movement of the duct automatically within limits provided as input.

In some harvesting machines a chopper of this type equipped with a duct for the ejection of the chopped crop can be brought out of the operating position, in which straw is ejected, into a non-operating position, in which the chaff ejected by the cleaning arrangement is ejected through the chopper and the duct. Preferably, when the duct is in the non-operating position, it is brought into a position whose input can be provided by the control arrangement and the motor. This embodiment is particularly useful when only a single chopper with only a single duct is available.

DETAILED DESCRIPTION

Figure 1:
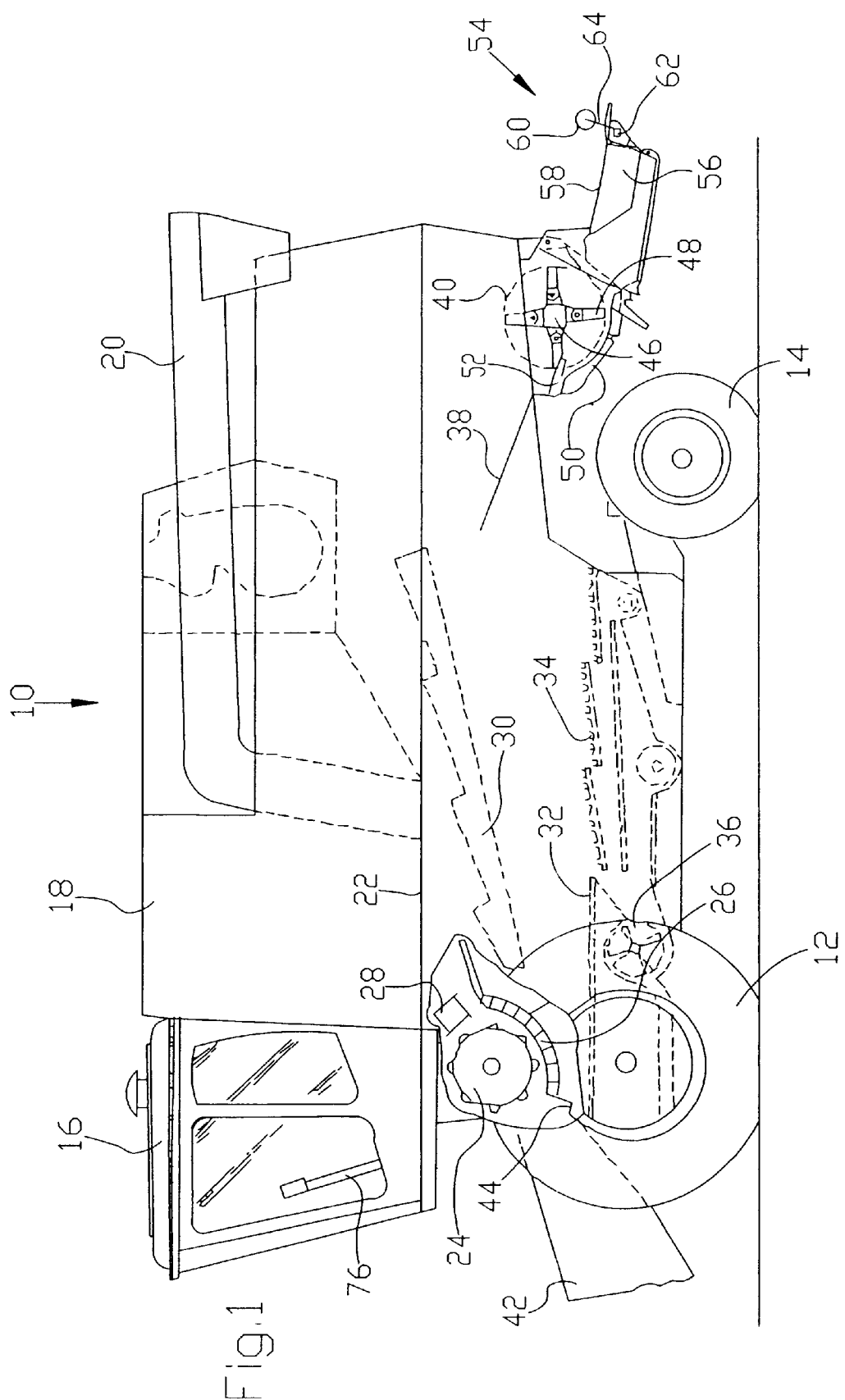
FIG. 1 is a side view of a harvesting machine with a distribution device according to the present invention.

The harvesting machine 10 illustrated in FIG. 1 comprises a self-propelled combine having front driven and rear steerable wheels 12 and 14. The harvesting machine 10 is also provided with an operator's cab 16 from which it can be controlled by an operator. A grain tank 18 is located behind the operator's cab 16. The grain tank 18 temporarily holds clean grain until discharged through an unloading auger 20. The grain tank 18 is supported on a frame 22 into which the harvested crop is conducted past stone trough 44 by a feeder house 42. The harvested crop is separated into its large and small components by a threshing cylinder 24, a threshing concave 26 and a beater 28. Straw walkers 30 located behind the threshing cylinder and concave 24 and 26 expand the crop mat to release trapped grain. Grain and chaff falling from the threshing concave 26 and the straw walkers 30 is directed to a grain pan 32. The grain pan 32 directs the grain and chaff to sieves 34. Cleaning fan 36 blows the lighter chaff out the rear of the harvesting machine 10. The cleaned grain is directed to the grain tank 18 by an elevator, not shown. The large crop components of the harvested crop are conducted over the straw walkers 30 and a straw guide vane 38 to a straw chopper 40.

The straw chopper 40 includes a rotor 46 having pendulously suspended blades 48 distributed over its circumference and over its length, that rotates in a housing 50 about an approximately horizontal axis extending transverse to the direction of operation. The rotating blades 48 in combination with the shear bars 52 chops the large harvested crop components into smaller pieces.

Figure 2:
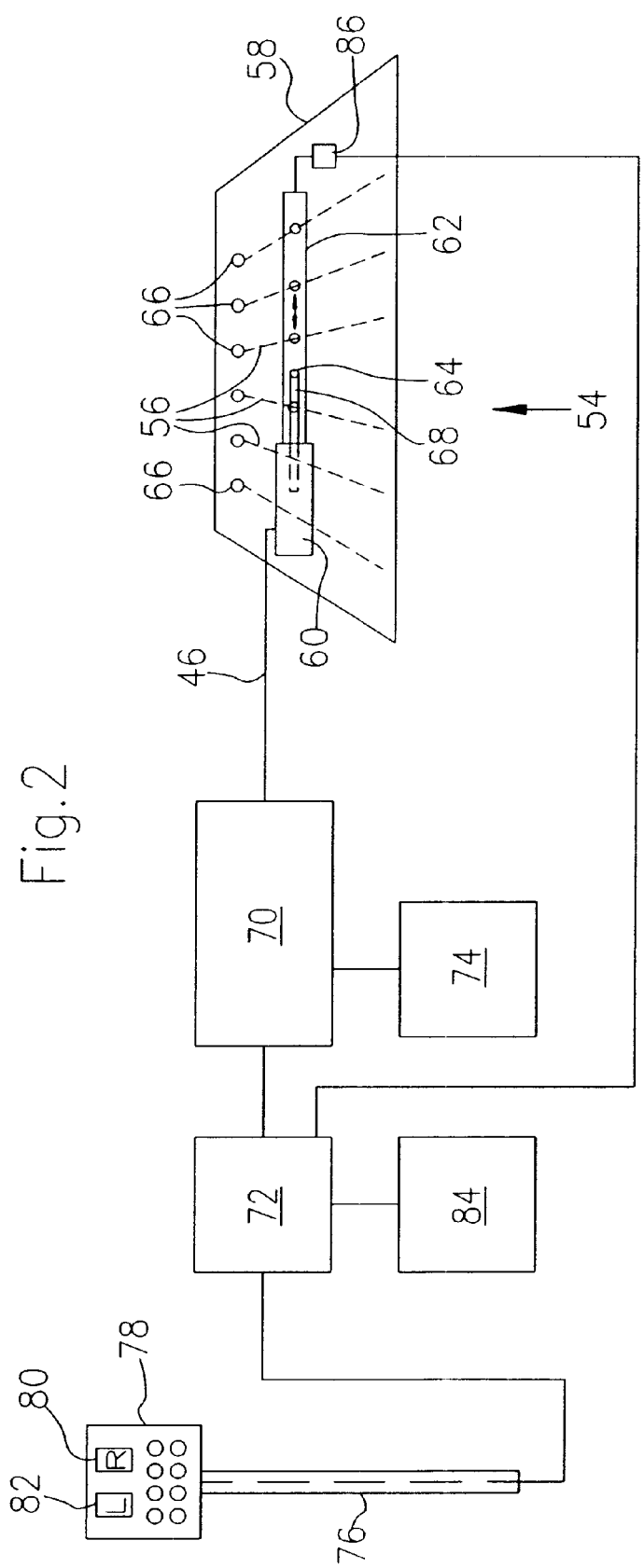
FIG. 2 is a schematic of the control arrangement for the distribution arrangement.

The rear of the straw chopper 40 is provided with a distribution device 54 is shown in greater detail in FIG. 2. The distribution device 54 includes a number of guide arrangements 56 arranged alongside each other in the form of guide vanes. The guide arrangements 56 are arranged beneath a straw distribution hood 58. The guide arrangements 56 are pivotally coupled at their forward ends about a vertical axis 66, on the straw distributor hood 58. The guide arrangements 56 are coupled to each other in their region located further to the rear by a slide 62. The slide 62 is moved left and right by a coupling rod 64 that extends upward through a slot in the straw distributor hood 58. The coupling rod 64 is positioned by a motor 60 in the form of a double acting hydraulic cylinder having a piston rod 68. The use of an electric motor linear actuator as motor 60 is also conceivable. In this way the motor 60 is arranged to reposition the rear ends of the guide arrangements 56 transverse to the direction of operation and to predetermine the direction of ejection of the guide arrangements 56, along which the chopped crop flows. Furthermore it is conceivable that each of the left and the right half of the guide vanes can be repositioned by a separate motor.

As shown in FIG. 2 the motor 60 is connected to a source 74 of pressurized hydraulic fluid through a valve assembly 70. The valve assembly 70 is controlled electromagnetically by an electronic control arrangement 72. A sensor 86 coupled mechanically with the slide 62, that may be configured, for example, as a slide potentiometer, is connected with the control arrangement 72, in order to provide it with a position feedback signal which contains information about the position of the slide 62.

A drive control lever 76 is arranged in the operator's cab 16 alongside the operator's seat. It can be pivoted about a horizontal axis extending transverse to the direction of operation and is used for the input of the forward propulsion velocity of the harvesting machine 10 on a field. At its upper side the drive control lever 76 is equipped with a head 78 on which a row of keys is arranged that can be actuated. Two of the keys are used as position input devices 80 and 82. The right position input device 80 is designated with an R and is used to reposition the guide arrangement 56 to the right. The left position input device 82 is designated with an L and is used to reposition the guide arrangement 56 to the left. Other keys control additional functions of the harvesting machine. The position input devices 80 and 82 are connected over a line, particularly a bus line, with the control arrangement 72. It would also be conceivable to arrange the position input devices 80 and 82 at any desired other position in the operator's cab 16.

Furthermore the control arrangement 72 is connected to a non-volatile, battery supported memory arrangement 84.

Figure 3:
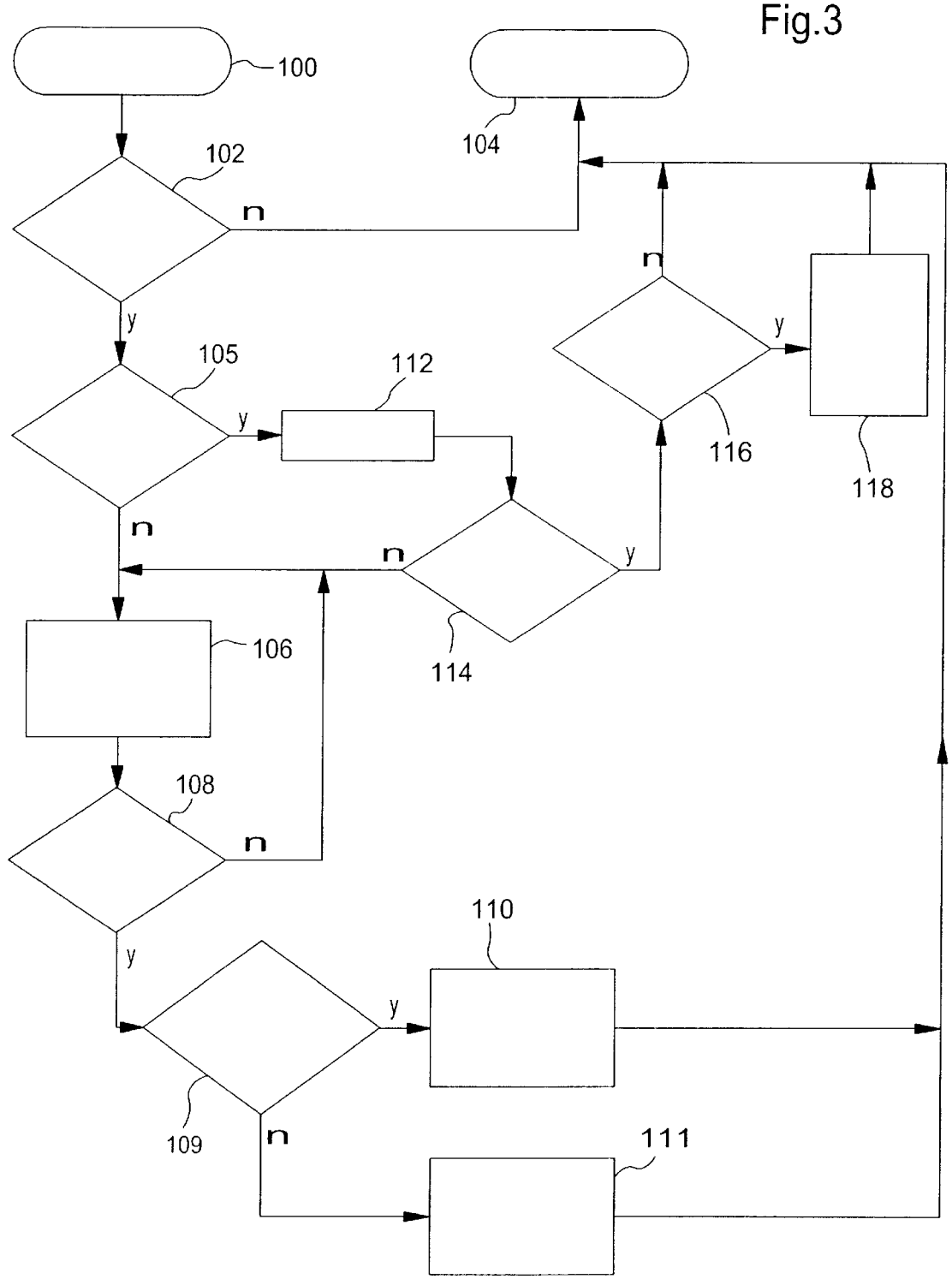
FIG. 3 is a flow chart of a routine for repositioning the distribution arrangement to the left.
Figure 4:
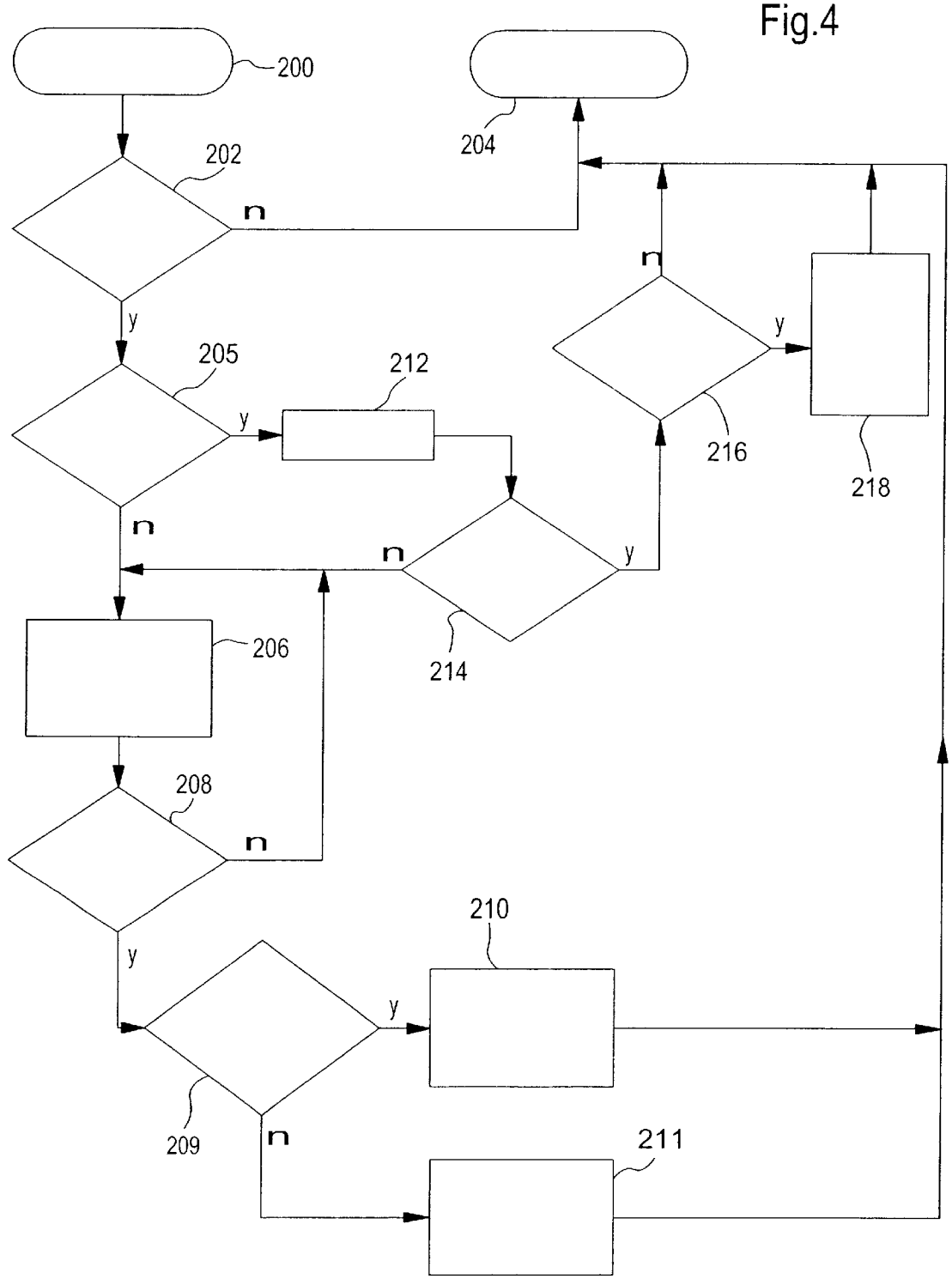
FIG. 4 is a flow chart of a routine for repositioning the distribution arrangement to the right.

During the operation the control arrangement 72 performs the routines shown in FIGS. 3 and 4 in relatively short time intervals (a few milliseconds) one after the other.

The operation of the first routine of control arrangement 72 is illustrated in FIG. 3 and begins with the start in step 100. In step 102 the control arrangement 72 determines the position of the input device 82, that is the control arrangement 72 determines if the key designated with L is actuated. If no, the routine is ended in step 104. If yes, the control arrangement 72 proceeds to step 105 wherein the control arrangement 72 determines if the time period since the last repositioning of the guide arrangement (step 106 or step 206) is greater than a predetermined time interval T2. If this time interval, is not greater than the predetermined time interval T2, for example 10 seconds, then the control arrangement 72 is in a third operating mode in which an actuation of the position input device 82 has the immediate result of repositioning the guide arrangement 56 in the direction associated with the position input device 82, that is, to the left. Thereby a negative result to the question in step 104 is followed by step 106 in which the motor 60 is activated and moves the guide arrangement 56 to the left. Step 106 is followed by step 108 in which the control arrangement 72 determines whether the position input device 82 has again been released by the operator. If the answer is no, step 106 again follows. If yes, step 109 follows, in which the control arrangement 72 determines whether the guide arrangement 56 is located to the right of the center. If that is the case, step 110 follows, in which information derived from the measured values of the sensor 86 regarding the immediate position of the guide arrangement 56 on the right side is stored in the memory arrangement 84, and upon which the routine is ended in step 104.

If the control arrangement determines that guide arrangement 56 is in the center or left of center, step 111 follows, wherein information derived from the measured value of the sensor 86 regarding the immediate position of the guide arrangement 56 on the left side is stored in the memory arrangement 84. From step 111 the control arrangement 72 proceeds to the end in step 104. Depending on the position to which steering of the guide arrangement 56 was aimed, it is possible to store position data for the left and the right side in memory, which simplifies unsymmetrical steering. If the guide arrangement 56 is initially located on the right, and is repositioned only slightly to the left, it remains on the right side. Its position information is then stored in memory in step 110 as right position. However, if it is repositioned beyond the center to the left, then it is stored in memory as left position in step 111. Upon subsequent pressing of the keys 80 or 82 the information associated with the left or the right positions is recalled from memory.

In case that step 105 results in the fact that since the last repositioning of the guide arrangement 56 in step 106 a time interval has elapsed that is greater than the time interval T2, the control arrangement can operate in the first or the second operating mode. Then step 105 is followed by step 112 in which a predetermined time interval T1 is read (for example, of 2 seconds). Following this, step 114 follows in which the control arrangement 72 determines whether the position input device 82 has been released in the meantime. If that is the case, the position input device 82 is thereby actuated only for a relatively short time, step 116 follows in which the control arrangement 72 asks the question whether the guide arrangement 56 is located to the right of the center. If no, step 104 follows, if yes, step 118 follows in which the control arrangement 72 converts into the first operating mode and instructs the motor 60 to bring the guide arrangement 56 into a position that corresponds to the value last stored in memory on the left side. It would also be conceivable that the guide arrangement 56 is brought into the position that is symmetrical, with respect to the longitudinal center plane of the harvesting machine, that corresponds to the information stored in the memory arrangement 84. Here the signals of the sensor 86 and the information from the memory arrangement 84 are used. Since the memory arrangement 84 is non-volatile and the position of the guide arrangement 56 is stored in step 110 or 111, except for the symmetrical repositioning in step 118, in which, information about the immediate position is preserved, there is always actual position information stored in memory. It should be noted that step 116 is skipped if the guide arrangement is already located on the left side, if necessary accompanied by an acoustic and/or visual error message. In this case the operator must actuate the other position input device 80 briefly in order to pivot the guide arrangement 56 to the right side.

In case that step 108 results in the fact that the position input device 82 has not yet been released, step 106 again follows. Thereby the control arrangement transfers to the second operating mode in which the position input device 80 effects a repositioning of the guide arrangement 56 to the left.

The routine shown in FIG. 4 corresponds generally to that shown in FIG. 3; in each case, however, the question is posed whether the position input device 80 designated with R has been actuated and in step 206 the guide arrangement 56 is turned to the right. It remains to be noted that in steps 104 and 204 the time interval is recorded that has elapsed since any desired movement of the guide arrangements 56, that is, independent of the fact that the movement was to the left in step 104 or to the right in step 204. Furthermore appropriate measures must be taken in case both position input devices 80 and 82 are actuated exactly simultaneously.

As a result the distribution device 54 according to the invention makes it possible to reposition the guide arrangement 56 with the same position input devices 80 and 82 in different modes of operation that can be selected. In the first operating mode, that can be selected by a brief actuation of one of the position input devices 80 or 82 (step 116 and 216) the last operated position on the other side of the longitudinal center plane is the one that was actually operated (that is symmetrical to the actual position of the longitudinal center plane). This mode of operation makes it possible upon a change in the direction of operation to have the guide arrangement 56 conform to the new conditions. In the second operating mode that can be selected by an actuation over a longer time interval that is longer than T1 performed by actuation of one of the position input devices 80 or 82 which select an operating mode, the guide arrangement 56 is moved as long as the position input device 80 or 82 is actuated, where a range of repositioning options may be provided as input, at the end of which the motor 60 is automatically turned off. After the position input device 80 or 82 is no longer actuated in the second operating mode, the third operating mode becomes effective, in which an actuation of the position input device 80 or 82 for a time interval T2 leads immediately into the second operating mode.

Having described the illustrated embodiment, it will become apparent that various modifications can be made without departing from the scope of the invention as defined in the accompanying claims.

What is claimed is:

1. A distribution device for chopped crop discharged from a chopper arrangement of a harvesting machine having a longitudinal axis, comprising:

a guide arrangement for providing an input for effecting a direction of ejection of the chopped crop;

a motor arranged for repositioning the direction of ejection of the guide arrangement;

a control arrangement is connected with the motor and a position input device, the position input device can be actuated by the operator for inputting of a desired position of the guide arrangement, characterized by the control arrangement can be operated selectively in a first operating mode and a second operating mode wherein the first operating mode is activated upon an actuation of the position input device for a time interval that is less than a predetermined threshold value, and the second operating mode that is activated upon an actuation of the position input device for a time interval that is greater than the predetermined threshold value, and that the control arrangement controls the motor in the first operating mode in such a way that the guide arrangement is brought into a predetermined position and activates the motor in the second operating mode as long as the position input device is actuated.

2. A distribution device as defined by claim 1 further comprising an additional position input device, wherein the position input device and the additional position input device are associated with opposite directions of movement of the guide arrangement.

3. A distribution device as defined by claim 2 wherein the control arrangement controls the motor in the first operating mode in such a way that the guide arrangement is brought into a position that is symmetrical to its position relative to the longitudinal axis of the harvesting machine before the position input device is actuated.

4. A distribution device as defined by claim 3 wherein the control arrangement stores in memory position information about the position of the guide arrangement prior to one of the position input device and additional position input device being actuated.

5. A distribution device as defined by claim 4 wherein the predetermined threshold value of the time interval can be changed.

6. A distribution device as defined by claim 1 wherein the predetermined threshold value of the time interval can be changed.

7. A distribution device as defined by claim 2 wherein the predetermined threshold value of the time interval can be changed.

8. A distribution device as defined by claim 5 wherein the control arrangement, after leaving the second operating mode makes a transition into a third operating mode for a predetermined second time interval after actuation of the position input device the second operating mode is immediately active.

9. A distribution device as defined by claim 1 wherein the control arrangement, after leaving the second operating mode makes a transition into a third operating mode for a predetermined second time interval after actuation of the position input device the second operating mode is immediately active.

10. A distribution device as defined by claim 2 wherein the control arrangement, after leaving the second operating mode makes a transition into a third operating mode for a predetermined second time interval after actuation of the position input device the second operating mode is immediately active.

11. A distribution device as defined by claim 8 wherein the length of the second time interval can be changed.

12. A distribution device as defined by claim 9 wherein the length of the second time interval can be changed.

13. A distribution device as defined by claim 10 wherein the length of the second time interval can be changed.

14. A distribution device as defined by claim 11 wherein the guide arrangement is arranged downstream of a straw chopper.

15. A distribution device as defined by claim 14 wherein the guide arrangement includes one or more guide vanes.

* * * * *